Sept. 10, 1968   H. J. PEDERSON   3,400,715
ATTACHMENT FOR INJECTION APPARATUS
Filed Jan. 4, 1966   2 Sheets-Sheet 1
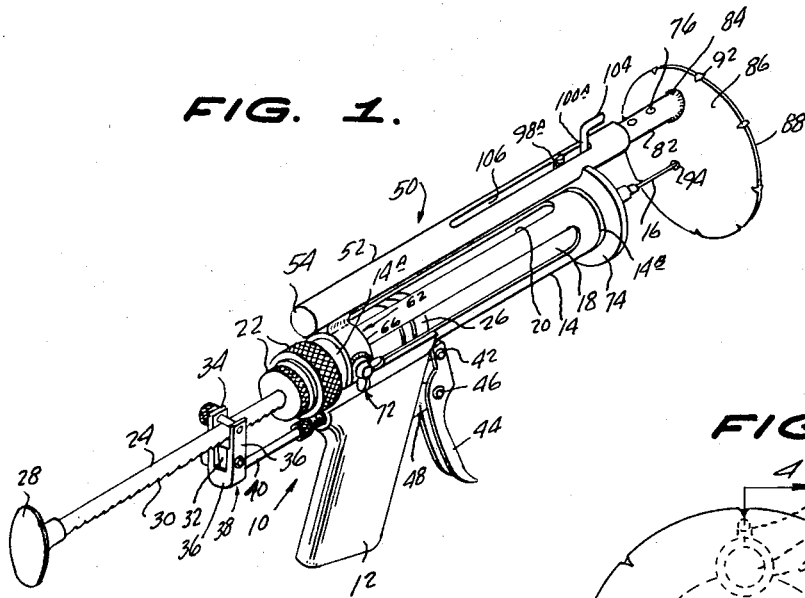
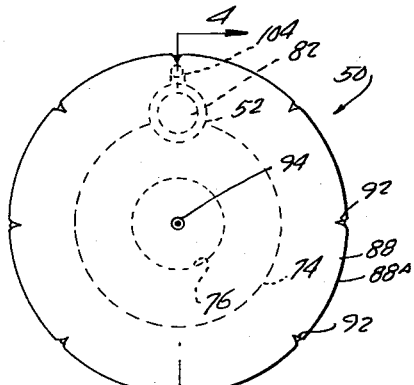
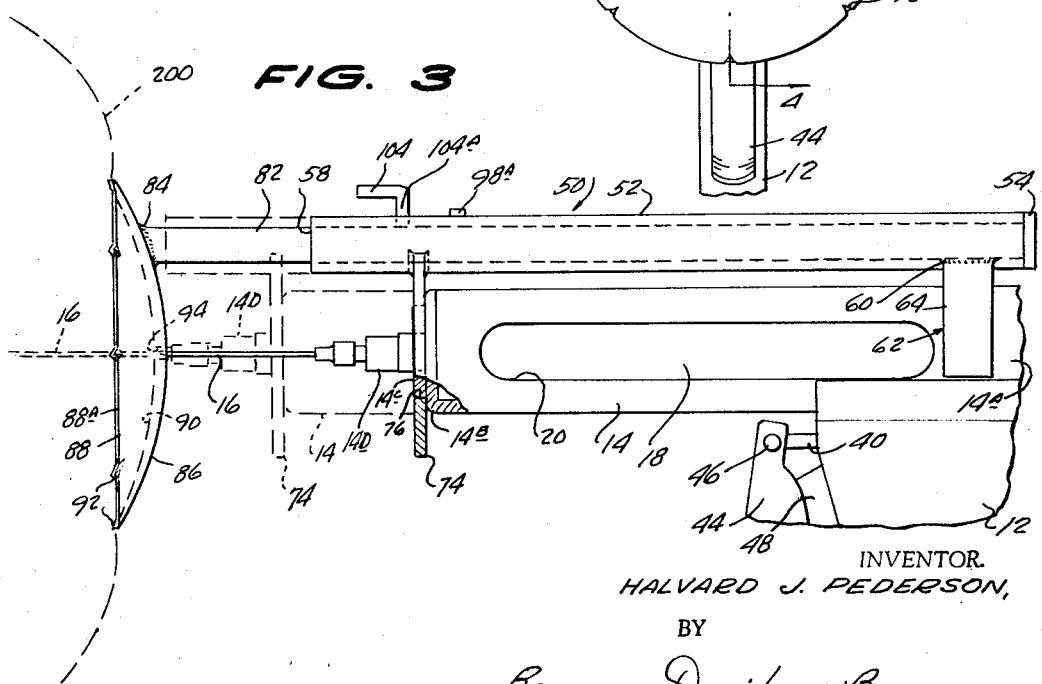
INVENTOR.
HALVARD J. PEDERSON,
BY
Berman, Davidson & Berman
ATTORNEYS.

Sept. 10, 1968      H. J. PEDERSON      3,400,715
ATTACHMENT FOR INJECTION APPARATUS
Filed Jan. 4, 1966      2 Sheets-Sheet 2
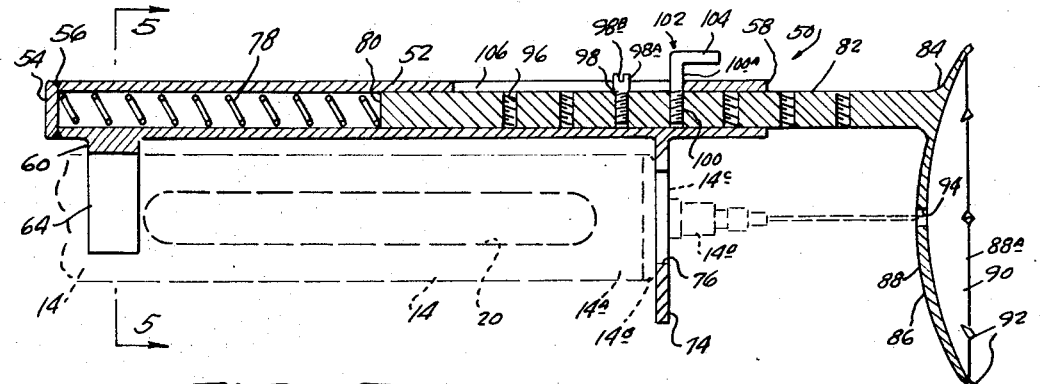
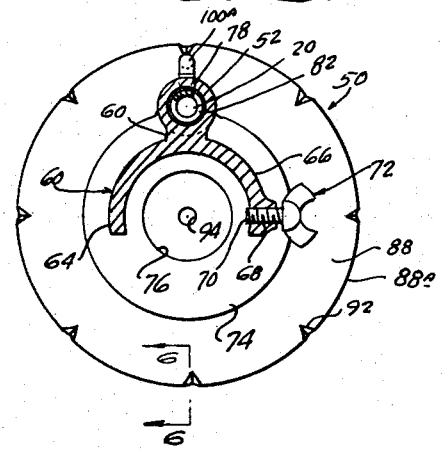 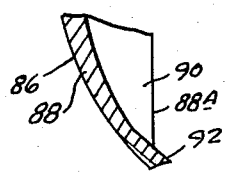
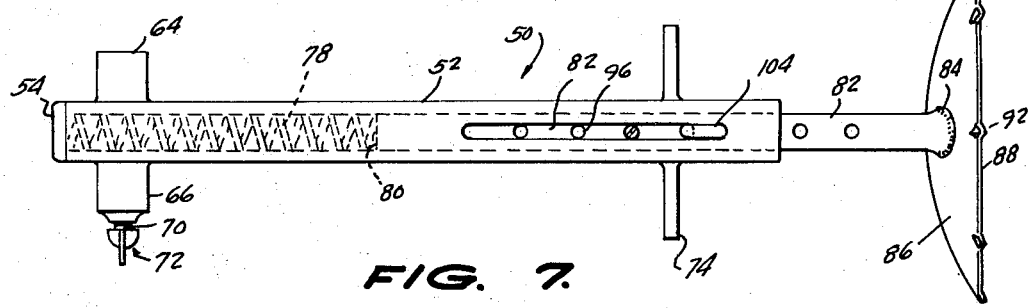
INVENTOR.
HALVARD J. PEDERSON,
BY
Berman, Davidson & Berman
ATTORNEYS.

United States Patent Office 3,400,715
Patented Sept. 10, 1968

3,400,715
ATTACHMENT FOR INJECTION APPARATUS
Halvard J. Pederson, Cartwright, N. Dak. 58838
Filed Jan. 4, 1966, Ser. No. 518,638
9 Claims. (Cl. 128—215)

ABSTRACT OF THE DISCLOSURE

For use with a conventional hypodermic syringe having a barrel, a piston and a cannula, an attachment comprising: a tubular member having means for rigidly but detachably attaching the same to the barrel of a syringe; a plunger slidably received in said tubular member and having its free end projecting from one end of said tubular member; means biasing said plunger out of said tubular member; a plate projecting laterally from the free end of said tubular member, said plate having an aperture to pass said cannula, and selective and adjustable stop means engaging said plunger and operative in a slot in said tubular member for limiting motion in both directions longitudinally of said tubular member.

---

This invention relates to the general field of medicine and, more specifically, to an improvement in the art of hypodermic injection. As such, the instant invention pertains to an attachment for hypodermic apparatus, and while the invention described, illustrated and claimed herein has a background reference to animal husbandry, the use of the attachment with hypodermic apparatus employed in the medical treatment of humans and for other purposes is herein envisioned.

One of the major problems a veterinarian encounters in the vaccinating of animals resides in the fact that the thrust of the needle to the extent required for subcutaneous injection causes the animal to rear, buck and jerk, and this reaction by the animal frequently results in the breakage of the cannula below the skin surface and its subsequent removal is quite difficult. It is not infrequent that even the most experienced veterinarian will inadvertently cause the point of the cannula to tear the animal's flesh under the skin as the animal reacts to the injection by rearing, bucking, and jerking.

Various attempts have been made to compensate or eliminate cannula breakage and the tearing of the flesh as, for example, the use of larger hypodermic syringe needles. It has been found that the use of larger needles is unsatisfactory in that substantially all of the difficulties and objections encountered in using a smaller needle remain, and in addition thereto an additional problem is created in that the larger needle will make a hole in the animal's flesh large enough to permit the vaccine or other medicines to drain back out of the injection opening when the cannula is withdrawn, and this necessitates that the operator of the hypodermic apparatus cover the hole with his hand to give the treating fluid sufficient time to be assimilated in the body of the animal. It has been found that hypodermic apparatus equipped with an attachment constructed in accordance with this invention materially, if not completely, obviates many of the objections and disadvantages encountered in prior art apparatus as but partially stated supra.

From observation it was learned that if the rump of an animal is thumped or tapped occasionally prior to the insertion of the needle in carying out a vaccinating operation, the thumping or tapping of the rump of the animal tends to steady it or to condition it to the extent that the animal will not buck, rear or jerk when the vaccinating needle is inserted. This observed conditioning of the animal's reflexes minimizes the possibility of damaging the flesh and reduces cannula breakage, but it is impossible, of course, to be certain at all times that the animal will docilely receive the needle without violent physical reaction.

It is, therefore, one of the primary objects of this invention to provide an attachment for use in conjunction with hypodermic apparatus used in the vaccination of animals wherein the attachment, when so used, obviates the possibility of needle breakage and minimizes the possibility of tearing subcutaneous flesh.

Another object of this invention is to provide an attachment for hypodermic apparatus used in the vaccination of animals wherein the apparatus may be pre-set to permit penetration of the cannula to a predetermined depth.

A further object of this invention is to provide an attachment for hypodermic apparatus of the type generally described above wherein the attachment may be adapted for use in conjunction with hypodermic apparatus known in the prior art and presently available on the open market, or which may be manufactured as an adjunct to hypodermic apparatus in current manufacture.

As a still further object of this invention, it is proposed to provide hypodermic apparatus, of the type to which reference has been generally made above, which may be used just as effectively by farmers, ranchers and other persons having no formal training as well as by veterinarians or other persons highly skilled in the medical treatment of animals.

This invention contemplates, as a still further object thereof, the provision of an attachment for hypodermic apparatus as described above, wherein the attachment is non-complex in construction and assembly, inexpensive to manufacture and maintain, and which is rugged and durable in use.

Other and further objects and advantages of the instant invention will become more manifest from a consideration of the following specification when read in conjunction with the annexed drawings, in which:

FIGURE 1 is a perspective view of a hypodermic apparatus used in the medical treatment of animals and illustrating the attachment therefor constructed in accordance with this invention releasably-mounted thereon;

FIGURE 2 is an enlarged front elevational view of the attachment and hypodermic apparatus;

FIGURE 3 is a top plan view of the hypodermic apparatus and the attachment therefor and showing in dotted lines the usage of the attachment;

FIGURE 4 is a longitudinal medial detail cross-sectional view of the attachment and showing the hypodermic apparatus in phantom lines, FIGURE 4 being taken substantially on the vertical plane of line 4—4 of FIGURE 2, looking in the direction of the arrows;

FIGURE 5 is a detail cross-sectional view of the attachment, FIGURE 5 being taken substantially on the vertical plane of line 5—5 of FIGURE 4, looking in the direction of the arrows;

FIGURE 6 is a fragmentary enlarged detail cross-sectional view, FIGURE 6 being taken substantially on the vertical plane of line 6—6 of FIGURE 5, looking in the direction of the arrows; and FIGURE 7 is a top plan view of the attachment.

Referring now more specifically to the drawings, reference numeral 10 designates, in general, a conventional hypodermic device which is purchaseable on the open market and, per se, does not constitute the subject matter of this invention. However, a brief description of this apparatus or device is deemed necessary and the same is set forth below to lend intelligence to the understanding of the attachment therefor which does form the subject matter of this invention and which is described in detail infra. Thus, the hypodermic apparatus shown herein is seen to comprise a normally upright substantially rectangular handle 12 to the upper end of which is rigidly-secured one end of an elongated substantially hollow cylindrical barrel 14. The other end of the barrel 14 extends laterally and projects forwardly of the handle 12, and at its forward end the barrel 14 is fitted with a detachable and replaceable cannula 16. Telescoped within the barrel 14 is an elongated hollow substantially fluid medicine or vaccine-receiving magazine 18 having a pair of opposed open ends and preferably formed of a transparent material. The cannula 16 is, of course, in open communication at its inner end with the fluid contents of the magazine 18, and the fluid contents of the fluid magazine 18 are easily viewable through axially-elongated apertures 20 formed in the barrel 14. The aforementioned one end of the barrel 14 is provided with appropriate fittings 22 closing the same and the adjacent end of the magazine 18, and the fittings 22 serve as mounting means for an elongated piston rod 24 reciprocable therethrough.

One end of the piston rod 24 carries a plurality of pistons 26 in sliding and sealing engagement with the inner side of the magazine 18 and operates in conjunction with the piston rod 24 to eject the medical compound in the magazine 18 through the cannula 16, all in the conventional manner.

The other end of the piston rod 24 has a loading handle 28 fixedly-secured thereto, and the undeside thereof is provided with axially-extending and depending ratchet teeth 30 which are releasably-engaged by a pawl 32 carried between the arms 34 that project upwardly from the opposed ends, respectively, of the bight 36 of a U-shaped bracket 38. One end of a trigger rod 40 is fixedly-connected to the bight 36, and the other end thereof is mounted for reciprocation through the handle 12 and is pivotally-connected at 42 to the upper end of an arcuately-shaped trigger or digitally-operated lever 44, the latter being pivotally-mounted intermediate its ends on a pivot pin 46 carried on standard means 48 fixedly-secured to the handle 12 and extending below and parallel to the barrel 14 in vertically-spaced relation relative thereto.

The barrel 14 of the hypodermic device or apparatus 10 includes a back hollow cylindrical band portion 14A disposed adjacent the handle 12, and preferably, this portion of the barrel 14 is not intersected by the adjacent ends of the apertures 20. Additionally, the barrel 14 is provided with a front transversely-extending end closure wall 14B, and both elements 14A and 14B have a cooperative function with the attachment forming the subject matter of this invention and which is to be described below. It should be here noted that the closure wall 14B is generally formed with a reduced central portion 14C on which is mounted the conventional coupler means 14D to effect connection between the inner end of the canula 16 and the contents of the magazine 18.

The attachment to which this invention directly relates is assigned the general reference numeral 50 and is seen to comprise an elongated substantially hollow cylindrical sleeve 52 forming the main body portion of the attachment 50, the sleeve 52 having a transversely-extending rear end closure wall 54 welded or otherwise fixedly-secured thereto as at 56, and an oppositely-disposed open front end 58. Integrally-formed with the sleeve 52, adjacent to, but spaced inwardly from its rear closure wall 54, is the bight portion 60 of a downwardly-opening arcuate clamp 62 having downwardly-depending curvilinear arms 64, 66, the bight 60 and arms 64, 66 preferably having an arcuate length greater than 180°. As is seen clearly in FIGURE 5, the arm 66 is, adjacent the outer free end thereof, formed with a transversely-extending tapped opening 68 that threadedly-receives the shank 70 of a wing bolt 72.

Adjacent to, but spaced inwardly from the open end 58 is a depending flat cylindrical annular plate 74 having an opening 76 extending transversely therethrough. The center point of the arcuate clamp bight 60 and its depending arms 64, 66 and that of the plate 74 are contained on an axis which is coincident with the longitudinal axis of the barrel 14 when the attachment 50 is mounted on the hypodermic device or apparatus 10 in the manner to be described.

Disposed in the sleeve 52 is an elongated helicoidal spring 78 having an end thereof abutting the end wall 54, the other end of the spring 78 engaging the inner end 80 of an elongated substantially cylindrical plunger rod 82. The other or outer end of the plunger rod 82 is fixedly-connected at 84 to the upper convex side 86 of a concave-convex plate 88, and the convave side 90 thereof carries a plurality of circumferentially-spaced spurs 92 which are expressed outwardly away from the concave side 90. The plate 88 is also formed with a centrally-located transversely-extending opening 94 having an axis coincident with the aforementioned coincident axes.

The piston rod 82 is formed with a plurality of diametrically-extending threaded bores 96 axially-spaced relative to the longitudinal axis of the piston rod 82 at regular intervals. The bores 96 are adapted to selectively-receive a threaded limit screw 98 and the threaded shank 100 of an L-shaped stop pin 102 having an offset handle end 104. As is seen in the several figures of the drawings, the sleeve 52 is formed with an elongated substantially rectangular axially-extending slot 106 having an end thereof terminating adjacent the open end 58, the slot 106 being adapted to receive therethrough the upper end 98A of the screw 98 which is slotted at 98B to receive therein an adjustment tool such as, for example, the blade of a screwdriver (not shown). The slot 106 also receives transversely-therethrough the upper end 100A of the shank 100, and the handle end 104 of the stop pin 102 is disposed laterally of the outer side of the sleeve 58 and in spaced relationship with respect thereto.

To use the attachment 50, and assuming that the hypodermic device or apparatus 10 is assembled in the manner shown and described, and that the magazine 18 has been loaded with a vaccine or other medical preparation (not shown), the piston rod 24 will have been moved to its outermost extended position as shown in FIGURE 1, and the pistons 26 will have been moved a corresponding distance toward the handle 12. The barrel 14 is then passed through the depending arms 64, 66 until the front end closure wall 14B engages against the adjacent side of the annular plate 74 and the reduced end 14C is telescoped or centered within the opening 76.

With the end wall 14B fitting flush against the annular plate 74, the wing bolt 72 is tightened to firmly clamp the barrel 14 between the arms 64, 66. With the barrel 14 so clamped, the cannula 16 should be disposed in axially-aligned position with the opening 94. It is preferable in the exercise of the teachings of this invention that the stop pin 102 be selectively-engaged or threaded in one of the bores 96 which will permit the plate 86 to move in close proximity to the outer end of the cannula 16 when all of the component elements of the hypodermic apparatus 10 and the attachment 50 are in their inoperative positions.

With the attachment 50 in place on the hypodermic apparatus 10 as described, the veterinarian is now ready to give the vaccination shot to the animal and, as has been explained above, the veterinarian will usually condition the animal by lightly thumping the rump 200 thereof (see FIGURE 3) in the general area where the injection is to be given, and will, thereafter, engage the plate 88 over the hide of the animal and in the desired position to properly receive the injection. The injection is given by grasping the handle 12 with a finger on the lever 14 and exerting a force on the handle in the direction of the cannula 16, causing the apparatus 10 including the cannula 16 and the sleeve 52 to move toward the hide of the animal 200, penetrating the same to the distance which is limited by the engagement of the upper end 98A of the screw 98 with the inner end of the slot 106. At this time, the veterinarian will pull on the lever 44, causing the piston rod 24 to advance in the direction of the cannula 16 thereby driving the pistons 26 in the same direction and forcing the vaccine through the cannula 16 into the animal.

Should the animal receiving the shot rear, buck or jerk, the cannula 16 is held at all times perpendicular to the animal's rump 200 since it is maintained in steady position through the contact of the plate 88 with the hide of the animal, thereby eliminating all danger of tearing the animal's flesh or breaking the needle which would make necessary the difficult task of recovering that portion of the needle which remains buried in the animal's rump.

As soon as the shot has been given, the lever 44 is released and the force on the handle 12 is relieved and exercised in the reverse direction to effect the withdrawal of the cannula 16. As this action takes place, the sleeve 52 also moves away from the animal's rump and the plunger rod 82, under the influence of the spring 78 moves outwardly away from the open end 58 of the sleve 52 until the upper end 100A of the shank 100 makes engagement with the other end of the slot 106 at which time the attachment 50 and the hypodermic apparatus 10 may be moved together away from the animal.

It should be clear from a consideration of the foregoing specification that the plate 88, in addition to serving as a steadying means for the hypodermic apparatus 10, also lends itself to the provision of guide means for the cannula 16 and assists to some degree in preventing the fracture of the cannula 16 at a point below the skin surface of the animal being vaccinated.

The stop screw 98 may be selectively-engaged within any one of the bores 96 to control the depth of penetration of the cannula 16 and the stop pin 102 may be also selectively-engaged within any one preselected bore 96 to cause the plate 88 to be positioned immediately adjacent the outer end of the cannula 16 for the reasons and purposes described above. Additionally, the handle end 104 of the stop pin 102 may be tightened within its selected bore 96 in order to prevent relative movement between the plunger rod 82 and the cannula 16 to prevent inadvertent damage to the outer end of the cannula 16 and/or inadvertent physical injury to the operator or to the animal being treated.

It will be understood that the width of the slot 106 is such that its sidewalls 106A, 106B make tangential engagement with the adjacent diametrically-opposed sides of the stop screw 98 and stop pin 102 to hold the plunger rod 82 against axial rotation whereby the cannula 16 is constantly held in coaxial alignment with the opening 94 to prevent damage thereto and to insure accurate placement of the injection.

The spurs 92 are useful in the practice of this invention in the sense that the same comprise friction means engageable with the hide of the animal to be vaccinated and tend to maintain the attachment in its position substantially normal to the area surrounding the point at which the injection is given. The spurs 92 tend to lessen the bending of the cannula 16 when the animal physically reacts to the cannula penetration and holds the hypodermic apparatus 10 and the attachment 50 firmly in place.

If the animal being treated should react to the injection by bucking or jerking, the danger of cannula fracture is materially reduced through the use of the attachment 10 for the cannula may be withdrawn safely since the outer marginal edge 88A of the plate 88 then acts as a pivot point tending to maintain the plane of the marginal edge 88 perpendicular to the longitudinal axis of the cannula 16.

From a reading of the above specification in the light of the annexed drawings, it should now be clear that through the use of the attachment 50 the user need not resort to large-sized cannulas and, in many instances, hypodermic needles of a diameter smaller than those used in the conventional treatment of animals may be employed without incurring any of the disadvantages noted above.

Having described and illustrated one embodiment of this invention in detail, it will be understood that the same is offered merely by way of example, and that this invention is to be limited only by the scope of the appended claims.

What is claimed is:

1. For use with a conventional hypodermic syringe having a barrel, a piston and a cannula, an attachment comprising: a tubular member having means for rigidly but detachably attaching the same to the barrel of a syringe; a plunger slidably received in said tubular member and having its free end projecting from one end of said tubular member; means biasing said plunger out of said tubular member; a plate projecting laterally from the free end of said tubular member, said plate having an aperture to pass said cannula, and selective and adjustable stop means engaging said plunger and operative in a slot in said tubular member for limiting motion in both directions longitudinally of said tubular member.

2. An attachment as set forth in claim 1, wherein said plate has a convex-concave transverse configuration with the concave side facing away from the cannula.

3. An attachment for hypodermic apparatus as defined in claim 2, and spurs expressed outwardly of the concave side of said plate.

4. An attachment for hypodermic apparatus as defined in claim 3, wherein said attaching means includes a pair of arcuate arms at one end of said tubular member for engagement about one end of said barrel, and plate means at the other end of said tubular member for engagement with the other end of said barrel.

5. An attachment as set forth in claim 1, wherein said biasing means comprises a coiled spring contained in said tubular member and bearing on said plunger.

6. An attachment for hypodermic apparatus as defined in claim 5, wherein said tubular member is provided with an axially-extending transverse slot, and said limiting means includes means projecting radially from said plunger through said slot for engagement with the opposed ends of the latter upon maximum movement of said plunger in one direction or the other.

7. An attachment for hyopdermic apparatus as defined in claim 6, wherein said attaching means includes an arcuate clamp having the bight portion thereof fixedly-secured to said sleeve adjacent its said closed end, the arms of said clamp being adapted to engage about that end of said barrel remotely-disposed with respect to said cannula, and a bolt extending through one end of said arms for releasable-engagement with an adjacent portion of said barrel.

8. An attachment for hypodermic apparatus as defined in claim 7, wherein said attaching means includes a second plate fixedly-secured to the other end of said sleeve and projecting laterally therefrom for engagement with the other end of said barrel.

9. An attachment for hypodermic apparatus as defined in claim 8, wherein said last-named plate includes an opening extending transversely therethrough to receive a portion of the other end of said barrel therein.

References Cited

UNITED STATES PATENTS

| | | | |
|---|---|---|---|
| 2,656,785 | 10/1953 | Gannon | 141—329 XR |
| 2,730,099 | 1/1956 | Sullivan. | |
| 2,816,546 | 12/1957 | Luhmann. | |
| 2,876,770 | 3/1959 | White | 128—215 |
| 3,127,836 | 4/1963 | Silva. | |

RICHARD A. GAUDET, *Primary Examiner.*

M. F. MAJESTIC, *Assistant Examiner.*